United States Patent [19]
LeBreton

[11] 3,734,581
[45] May 22, 1973

[54] TANDEM THRUST BEARING
[75] Inventor: Albert F. LeBreton, Media, Pa.
[73] Assignee: Westinghouse Elecric Corporation, Pittsburgh, Pa.
[22] Filed: Aug. 3, 1971
[21] Appl. No.: 168,635

[52] U.S. Cl. ................................................308/160
[51] Int. Cl. ............................................F16c 17/06
[58] Field of Search ..........................308/160, 16 H

[56] References Cited
UNITED STATES PATENTS
1,315,069   9/1919   Alexanderson...................308/160

Primary Examiner—Charles J. Myhre
Assistant Examiner—Frank Susko
Attorney—A. T. Stratton et al.

[57] ABSTRACT

A mechanism for equalizing the load on a pair of tandem thrust bearings comprising a pair of cranks disposed on opposite sides of a rotatable shaft having a thrust load thereon each crank having a pair of links pivotally connected thereto, and pivotally connected to each of the thrust bearings to cause the thrust bearings to move in unison to distribute the load equally.

14 Claims, 4 Drawing Figures

3,734,581 ing and a device made in accordance with this invention for distributing the thrust load to the bearings;

TANDEM THRUST BEARING

BACKGROUND OF THE INVENTION

This invention relates to thrust bearings and more particularly to a plurality of thrust bearings mounted in tandem on a single shaft.

To carry high thrust loads rotating machines are equipped with large diameter thrust bearings or multiple tandem thrust bearings. Multiple tandem thrust bearings have the advantage of allowing smaller diameter thrust bearings to share the load, which results in greater efficiency as the friction losses in thrust bearing increase as the fifth power of the diameter, while the load carrying capacity of the thrust bearing increases as the square of the diameter. To share the load equally, tandem thrust bearings require special mechanisms, which help distribute the loads evenly to thrust plates as the thrust plates and thrust collars of two thrust bearings cannot be located on the shaft with sufficient accuracy so that the bearings share the thrust load. Mechanisms for distributing the load to tandem thrust bearings generally only provided for thrust load in one direction; for more detailed information on such thrust bearings and load distributing mechanisms utilized therewith, reference may be made to U.S. Pat. Nos. 1,677,093, 1,673,021, and 1,689,195, which are assigned to the same assignee as this invention.

SUMMARY OF THE INVENTION

In general, a double acting tandem thrust bearing for supporting a thrust load on a rotatable shaft, when made in accordance with this invention, comprises in combination at least two thrust plates, the thrust plate being movable axially with respect to the shaft, at least two thrust collars fastened to the shaft and means for cooperatively moving each thrust plate axially in either direction to continuously distribute the thrust load proportionally to each thrust plate in response to thrust from either direction.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
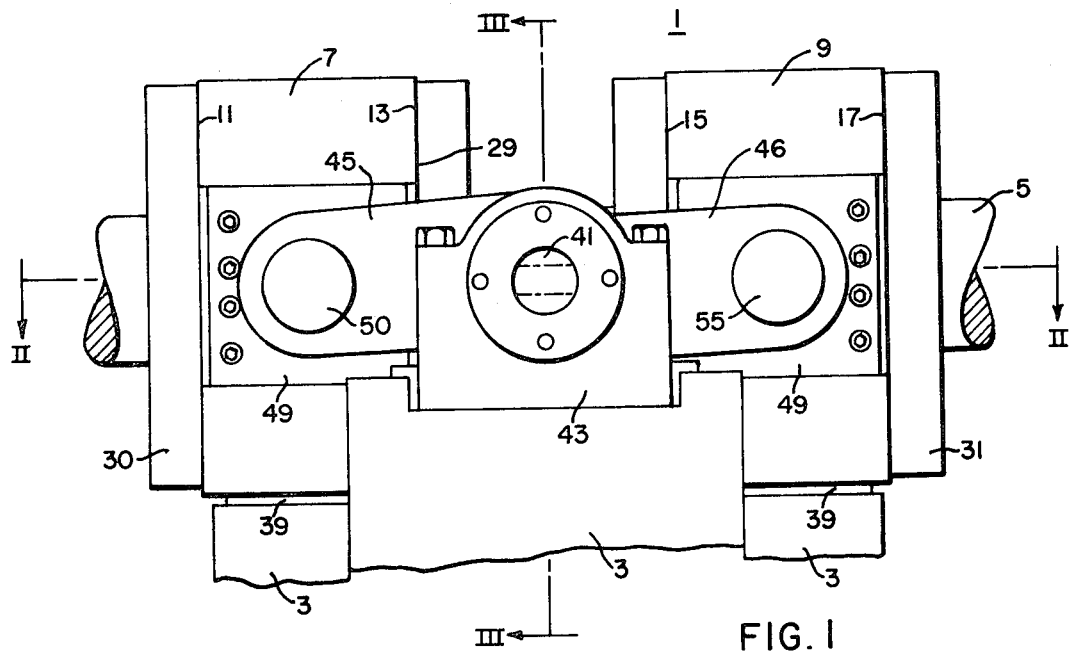
FIG. 1 is an elevational view of a tandem thrust bearing and a device made in accordance with this invention for distributing the thrust load to the bearings.
Figure 2:
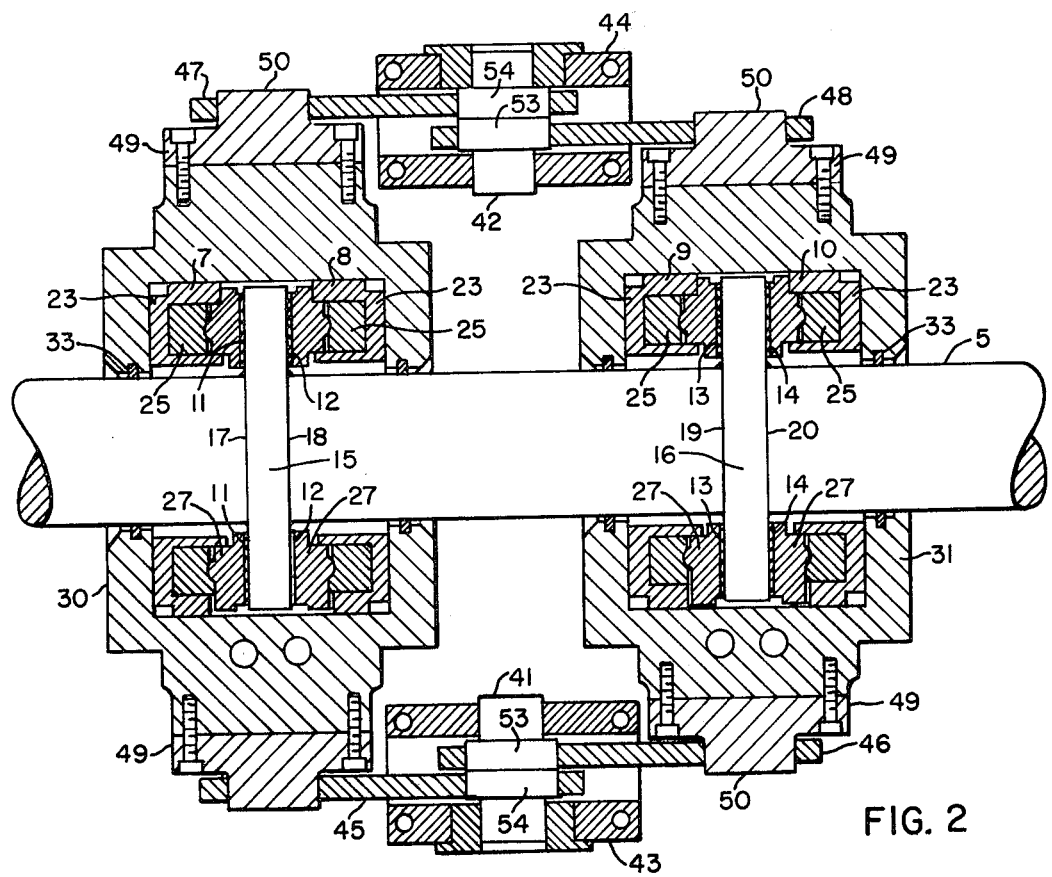
FIG. 2 is a sectional view taken on line II—II of FIG. 1.
Figure 3:
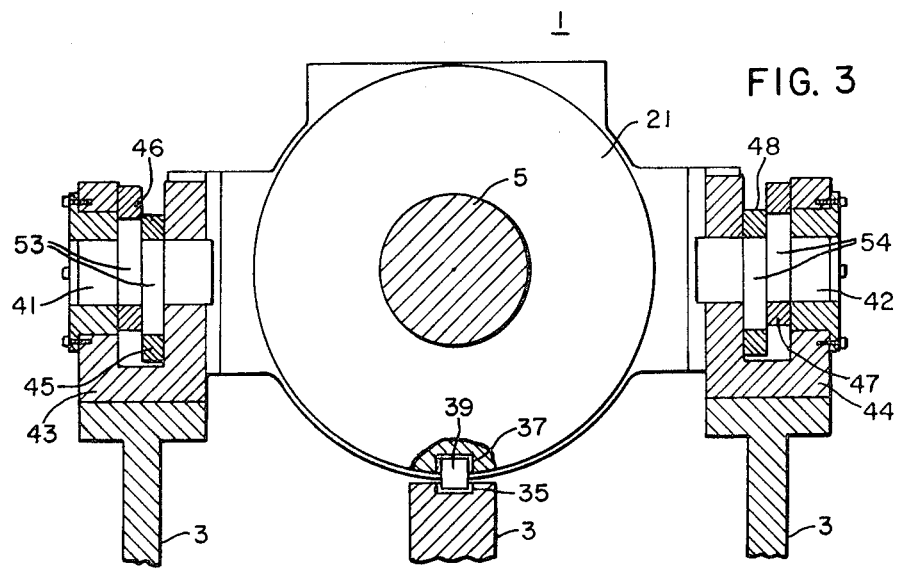
FIG. 3 is a vertical sectional view taken on line III—III of FIG. 1.

Referring now to the drawings in detail, FIGS. 1 through 3 show a double acting tandem thrust bearing 1 mounted on a base 3 for supporting a thrust load exerted on a rotatable shaft 5. The thrust bearing is so arranged to support the thrust load from either direction and comprises two pairs of thrust plates 7 and 8, and 9 and 10 having opposite, annular, parallel bearing surfaces 11 and 12 and 13 and 14, respectively, disposed normal to the axis of the shaft, and a pair of thrust collars 15 and 16. The thrust collars have annular bearing surfaces 17, 18, 19, and 20 disposed normal to the axis of the shaft and disposed to oppose bearing surfaces 11, 12, 13, and 14, respectively, on the thrust plate. The thrust collars 15 and 16 are fastened to the shaft or formed as an integral portion thereof, while the thrust plates 7, 8, 9 and 10 are disposed to move axially with respect to the shaft 5. The thrust plates 7, 8, 9 and 10 generally encircle the shaft, there being sufficient clearance between the shaft and an inner bore of the thrust plates to allow for vibration, out of roundness and eccentricity of the shaft.

The thrust plates 7, 8, 9 and 10 may be of the tapered land type having wedge shaped stepped bearing surfaces to provide a plurality of oil wedges between the rotating thrust collar and the thrust plate, the Kingsburg type as shown in FIG. 2, or some other type.

As shown in FIG. 2, the Kinsburg thrust plates comprise a split base ring 23, a plurality of leveling blocks 25 disposed within the ring 23 and a plurality of tilting pads or shoes 27, which are fastened to the leveling blocks 25 in such a manner that the shoes are free to change their angle with respect to the associated thrust collar in response to changes in load and speed to maintain a plurality of wedges of oil between the shoes and the thrust collar.

Bearing housings or casings 30 or 31 encase the associated thrust collars and thrust plates and have seals 33 disposed on the outboard ends thereof to prevent an excessive amount of oil from leaking through the end openings in the bearing casings 30 and 31.

Bearing surfaces 11, 12, 13 and 14 of the thrust plates 7, 8, 9 and 10 are preferably overlaid with babbit or some other commonly used bearing material to prevent damage to these bearing surfaces and their mating bearing surfaces if there is momentary contact therebetween.

Keyways 35 and 37 are disposed in the base 3 and in the bottom of the casings 30 and 31 and a key 39 fits within the keyways 35 and 37 to prevent the casings from rotating and cooperate with the casings 31 and 33 and base 3 to guide the thrust plates in axial direction. The keyways and one contact surface between the casings base are preferably lined with material having a low coefficient of friction allowing the casings and thus the thrust plates to move freely in axial direction.

A mechanism for cooperatively moving each thrust plate in either direction to continuously distribute the thrust load proportionally to each thrust plate in response to thrust from either direction is shown in FIGS. 1 through 3 and comprises a pair of cranks, levers, or rockers 41 and 42 pivotally mounted about their centers. The cranks 41 and 42 are mounted in support structures 43 and 44 which are fastened to the base 3 on opposite sides of the shaft 5. Two pairs of links 45 and 46, and 47 and 48 are pivotally connected to the cranks 41 and 43 and are disposed an equal distance from the centers thereon and at an angle of 180° about the centers of the cranks. The links are pivotally connected to the bearing casings 30 and 31 through connecting plates 49 and pins 50 fastened thereto or made integral therewith.

The cranks 41 and 42 are so disposed that planes through the centers of the pivots are generally disposed normal to the shaft to provide maximum axial movement of the thrust plates 7, 8, 9 and 10 disposed in the bearing casings 30 and 31 with minimum rotation of the cranks 41 and 42.

The cranks 41 and 42 as shown in FIGS. 1 through 3 are formed from a shaft having a pair of eccentric discs 53 and 54 disposed thereon, however, other types of levers or rockers arms could be utilized. The cranks 41 and 42 and links 45, 46, 47 and 48 when symmetrically disposed provide for generally equal distribution of the load between the thrust plates, however by adjusting the distance between the major axis of the cranks and the axis of the eccentrics the thrust load on each thrust plate can be proportioned to conform to any desirable ratio.

The link fastened to one side of the bearing casing is generally the same distance from the axis of the shaft as the link fastened to the opposite side of the bearing casing equalizing the forces on the thrust plate to prevent cocking and allowing the thrust plates to move freely in axial direction.

The operation of the double acting tandem thrust bearings and mechanism for distributing the thrust load equally to the bearings is as follows: A thrust load on the shaft in one direction, toward the left, in FIG. 2, causes the thrust collars 15 and 16 to move to the left and the bearing surfaces 17 and 19 to approach the bearing surfaces 11 and 13 on the thrust plates 7 and 9. An oil film produced by a lubricating oil system (not shown) keeps the surfaces apart. The pressure of the lubricating oil film is proportional to the thickness thereof so that, if the bearing surface 17 moves toward the bearing surface 11 the pressure of the oil film will increase, increasing the force on the bearing surface 11, which will cause the thrust plate 7 to move in one direction to the left. Movement of the thrust plate 7 in one direction, to the left, causes the links 45 and 47 to move to the left, which rotates the cranks 41 and 42 counterclockwise and results in the links 46 and 48 moving the thrust plate 9 in the opposite direction, the other direction, to the right, resulting in a decrease in the clearance between the bearing surfaces 13 and 19, thus increasing the pressure of the oil film and increasing the load on thrust plate 9 and equalizing the load on the thrust plates 9 and 7. A decrease in thrust load to the left causes the shaft to move in the other direction, to the right, and if the clearance between the surfaces 12 and 18 and 14 and 20 are not equal the pressure between the closest surface will be greater causing the thrust plate associated with the closest surfaces to move to the left and the other thrust plate to move to the right equalizing the thrust loading thereon.

The thrust collars 15 and 16 are disposed, in the casings 30 and 31, to transmit a thrust load on the shaft in the other direction, to the right, in a similar manner, thus providing a thrust bearing, which will equalize the thrust load between the bearings irrespective of the direction of the thrust load, this is particularly advantageous in a large steam turbine, in which the direction of the thrust load may reverse itself from low load to full load. The thrust collars and thrust plates are so disposed within the casings 30 and 31 to minimize the axial movement of the shaft in response to changes in direction of the thrust load to allow optimum axial clearances in rotating machinery utilizing the bearings and mechanisms hereinbefore described.

Figure 4:
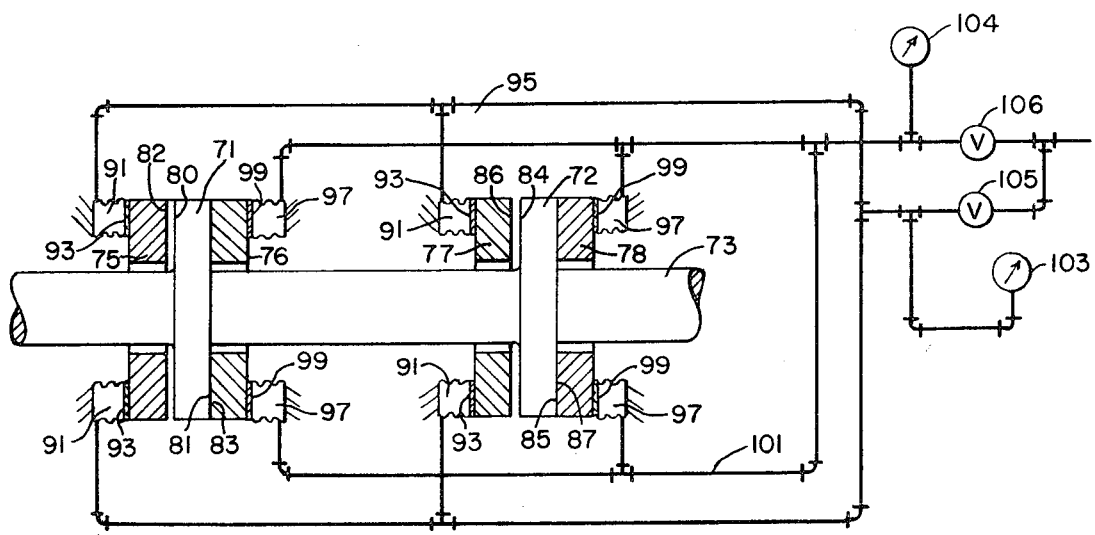
FIG. 4 is a modification of the thrust bearing and device shown in FIG. 1.

FIG. 4 shows a modification, wherein a pair of thrust collars 71 and 72 are fastened to, or made integral with, a shaft 73 subject to thrust loading in either direction. Thrust plates 75 and 76 and 77 and 78 generally encircle the shaft and are disposed adjacent the thrust collars 71 and 72 so that bearing surfaces 80 and 81 on the thrust collars 71 are respectively disposed adjacent the bearing surfaces 82 and 83 on the thrust plates 75 and 76, and the bearing surfaces 84 and 85 on the thrust collars 72 are respectively disposed adjacent the bearing surfaces 86 and 87, on the thrust plates 77 and 78. The bearing surfaces on the thrust plates are overlaid with a material such as babbit or other bearing material, which will minimize the damage to the bearing surfaces should the surfaces come in contact. A lubricating oil system (not shown) supplies the proper amount of lubricating oil to these bearing surfaces.

A plurality of chambers 91 and movable abutments 93 forming bellows, hydraulic cylinders, or diaphragm operators are so connected by a conduit 95 to be disposed in parallel so that, when charged with a predetermined amount of generally incompressible hydraulic fluid, the movable abutments 93 contact the the thrust plates 75 and 77 biasing them in one direction, to the right as shown in FIG. 4, with an equal amount of force so that the thrust load is shared equally between the thrust plates 75 and 77. A plurality of chambers 97 and movable abutments 99 forming bellows, hydraulic cylinders, or diaphragm operators are so connected by a conduit 101 to be disposed in parallel so that, when charged with a predetermined amount of hydraulic fluid, the movable abutments 99 contact the thrust plates 76 and 78 biasing them in the other direction, to the left as shown in FIG. 4, with an equal amount of force, so that the thrust load is shared equally by the thrust plates 76 and 78. Thus, this embodiment provides for equal distribution of the thrust load between tandemly disposed thrust collars and their associated thrust plates in response to thrust load in either direction.

Gauges 103 and 104 provide a means for measuring the value of the thrust load and the valves 105 and 106, which are disposed in the conduits 95 and 101, respectively, provide means for charging the conduits and chambers with hydraulic fluid from a source (not shown). Regulating the quantity of fluid in each conduit and the chambers in communication therewith sets the clearance between the thrust plates and thrust collars to regulate the axial movement of the shaft, when the thrust load reverses direction.

While only two thrust bearings are shown in FIG. 4, any number could be employed, thus providing an arrangement, wherein the thrust load in either direction is distributed equally over a plurality of tandemly disposed thrust bearings.

Providing equal distribution of the thrust load on a plurality of thrust bearings substantially reduces the frictional loss within the bearings. For example, two 17 inch thrust bearings can be used to replace one 25 inch thrust bearing. The bearing surfaces of these bearings are 288 and 258 square inches, respectively, and the load carrying capacity of the bearings would be 264,000 lbs. for the two 17 inch bearing, compared to 100,000 lbs. for the 25 inch bearing. The total amount of energy loss in the 25 inch bearing would be approximately 990 kilowatts and the energy loss in the two 17 inch bearings would be 290 kilowatts. The amount of oil required to cool the 25 inch bearing would be approximately 350 gallons/min., while the quantity of oil necessary to cool the two 17 inch bearings would be 210 gallons/min. These drastic reductions in the amount of energy consumed by the smaller bearings result from the fact that the losses vary as the fifth power of the diameter of the bearing and area increases as the second power. Therefore, systems like hereinbefore described, which equally distribute the thrust load to two or more tandemly disposed bearings, while being initially expensive, considerably reduce the operating cost of machinery incorporating such bearings.

What is claimed is:

1. A double acting tandem thrust bearing for supporting a thrust load on a rotatable shaft, said thrust bearing comprising, in combination, at least two thrust plates, said thrust plates being movable axially with respect to said shaft, at least two thrust collars fixed to said shaft and incompressible means for cooperatively moving said thrust plates axially in opposite directions, to continuously distribute said thrust load proportionally to each thrust plate in response to thrust from either direction.

2. A double acting tandem thrust bearing as set forth in claim 1, wherein the means for moving the thrust plates also provides support for said thrust plates in axial direction.

3. A double acting tandem thrust bearing as set forth in claim 1, wherein the thrust plates are so disposed as to be able to move only axially with respect to the shaft.

4. A double acting tandem thrust bearing as set forth in claim 1, wherein the thrust plates generally encircle the shaft.

5. A double acting tandem thrust bearing as set forth in claim 1, wherein the incompressible means for moving the thrust plates comprises a chamber and movable abutment associated with each thrust plate, a charge of fluid, and means for connecting said chambers in parallel to distribute the thrust load proportionally to each thrust plate.

6. A double acting tandem thrust bearing as set forth in claim 1, wherein the means for moving each thrust plate is a mechanism comprising a lever pivotally mounted, and a pair of links pivotally connected to said lever, each link also being pivotally connected to a separate thrust plate, whereby movement of one thrust plate in one direction causes proportional movement of the other thrust plate in the opposite direction, resulting in proportional distribution of the thrust load to each thrust plate.

7. A double acting tandem thrust bearing as set forth in claim 6 and further comprising means for confining movement of the thrust plates so that they move in axial direction only.

8. A double acting tandem thrust bearing as set forth in claim 1, wherein the means for moving each thrust plate is a mechanism comprising a pair of levers pivotally mounted and disposed on diametrically opposite sides of the shaft, a pair of links pivotally connected to each of the levers, one link of each pair being pivotally connected on opposite sides of one thrust plate, the other link of each pair being pivotally connected on opposite sides of the other thrust plate, whereby movement of one thrust plate in one direction causes proportional movement of the other thrust plate in the opposite direction resulting in proportional distribution of the thrust load to each thrust plate irrespective of the direction from which it is applied.

9. A double acting tandem thrust bearing as set forth in claim 8 and further comprising means for confining the movement of the thrust plates to movement in axial direction.

10. A double acting tandem thrust bearing as et forth in claim 9, wherein the lever is generally disposed to provide maximum axial movement of the thrust plates with a minimum angular movement of the levers.

11. A double acting tandem thrust bearing as set forth in claim 1, wherein there are two thrust collars and a pair of thrust plates associated with each thrust collar, a first thrust plate of each pair for resisting the thrust load in one direction and a second thrust plate of each pair for resisting the thrust load in the other direction.

12. A double acting tandem thrust bearing as set forth in claim 1 and further comprising means for supplying a film of lubricating fluid between each associated thrust plate and thrust collar.

13. A tandem thrust bearing for supporting a thrust load on a rotatable shaft comprising in combination at least two thrust plates, said thrust plates being movable axially with respect to said shaft at least two thrust collars fixed to said shaft, a mechanism comprising a lever pivotally mounted, a pair of links pivotally connected to said lever at an angle of 180° about said pivotal mount, each link being pivotally connected to at least one thrust plate, whereby movement of one thrust plate in one direction causes proportional movement of another thrust plate in the opposite direction resulting in proportional distribution of the thrust load.

14. A tandem thrust bearing as set forth in claim 13 wherein the lever is pivotally mounted at its center and the links are pivotally connected to said lever generally an equal distance from the center thereof, whereby movement of one thrust plate in one direction causes equal movement of another thrust plate in the opposite direction resulting in equal distribution of the thrust load between said thrust plates.

* * * * *